(12) United States Patent
Koh et al.

(10) Patent No.: US 6,829,436 B2
(45) Date of Patent: Dec. 7, 2004

(54) OPTICAL CROSS-CONNECT DEVICE WITH TRANSPARENCY

(75) Inventors: Jun-Ho Koh, Songnam-shi (KR); Sang-Ho Kim, Seoul (KR); Byung-Jik Kim, Songnam-shi (KR); Kwang-Jin Yang, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 09/750,365

(22) Filed: Dec. 28, 2000

(65) Prior Publication Data

US 2001/0015839 A1 Aug. 23, 2001

(30) Foreign Application Priority Data

Dec. 30, 1999 (KR) ......................................... 1999-66948

(51) Int. Cl.[7] ................................................. H04J 14/02
(52) U.S. Cl. ........................... 398/56; 398/79; 398/155; 370/358; 370/360
(58) Field of Search ................................. 398/154, 155, 398/202–214, 82, 83, 45, 52, 53, 54, 56; 370/358–360

(56) References Cited

U.S. PATENT DOCUMENTS

| | | | | |
|---|---|---|---|---|
| 5,557,648 A | * | 9/1996 | Ishihara | ....................... 375/376 |
| 6,333,799 B1 | * | 12/2001 | Bala et al. | ....................... 398/9 |
| 6,498,670 B2 | * | 12/2002 | Yamashita et al. | ........... 398/209 |

FOREIGN PATENT DOCUMENTS

| | | | |
|---|---|---|---|
| EP | 0342010 A2 | * 11/1989 | ........... H04L/25/52 |
| JP | 61-288593 | 12/1986 | |
| JP | 02-272848 | 11/1990 | |
| JP | 11-275030 | 10/1999 | |

OTHER PUBLICATIONS

Mokhtari et al., "Bit-rate transparent electronic data regeneration in repeaters for high speed lightwave communication systems", ISCAS '99. vol. 2, May 30–Jun. 2, 1999, pp. 508–511.*

* cited by examiner

*Primary Examiner*—Jason Chan
*Assistant Examiner*—Nathan Curs
(74) *Attorney, Agent, or Firm*—Cha & Reiter, L.L.C.

(57) ABSTRACT

A cross-connect device in an optical network which includes a demultiplexer for demultiplexing an input optical signal by channels; a plurality of arbitrary transmission optical receivers for converting the optical channel signals received from the demultiplexer to electrical signals and for recovering a clock signal and data according to a reference clock signal generated at the transmission rate of the electrical signals; a cross-connect switch for path-routing the electrical signals received from the arbitrary transmission optical receivers; a controller for controlling the path-routing of the cross-connect switch; a plurality of arbitrary transmission optical transmitters for converting the electrical signal received from each output port of the cross-connect switch to an optical signal; and, a multiplexer for multiplexing the optical signals received from the arbitrary transmission optical transmitters onto one stand of optical fiber.

4 Claims, 9 Drawing Sheets

OPTICAL CROSS-CONNECT DEVICE WITH TRANSPARENCY

CLAIM OF PRIORITY

This application claims priority to an application entitled "OPTICAL CROSS-CONNECT DEVICE WITH TRANSPARENCY" filed in the Korean Industrial Property Office on Dec. 30, 1999 and assigned Ser. No. 99-66948.

BACKGROUND OF THE INVENTION

1. Field of the Invention

The present invention relates generally to an optical communication system, and in particular, to a cross-connect device with an electrical cross-connect switch built therein.

2. Description of the Related Art

In an optical communication system, a wavelength multiplexing is implemented to make transmission systems more economical. A cross-connect device is installed at an intermediate node between an upper node (i.e., a central base station) and a lower node (i.e., a subscriber). The cross-connect device involves transmission and assignment of channel signals. In addition, the device plays an important role in optimizing traffic, congestion, and network growth for an optical network as well as improving the network survivability.

Diverse transmission formats are available in the optical transmission system in order to transmit information at different bit rates. The common transmission formats include SDH/SONET (Synchronous Digital Hierarchy/Synchronous Optical Network), FDDI (Fiber Distributed Data Interface), ESCON (Enterprise Systems Connectivity), Fiber Channel, Gigabit Ethernet, and ATM (Asynchronous Transfer Mode), wherein each operates at 125 Mbps, 155 Mbps, 200 Mbps, 622 Mbps, 1062 Mbps, 1.25 Gbps, and 2.5 Gbps, respectively.

Figure 1:
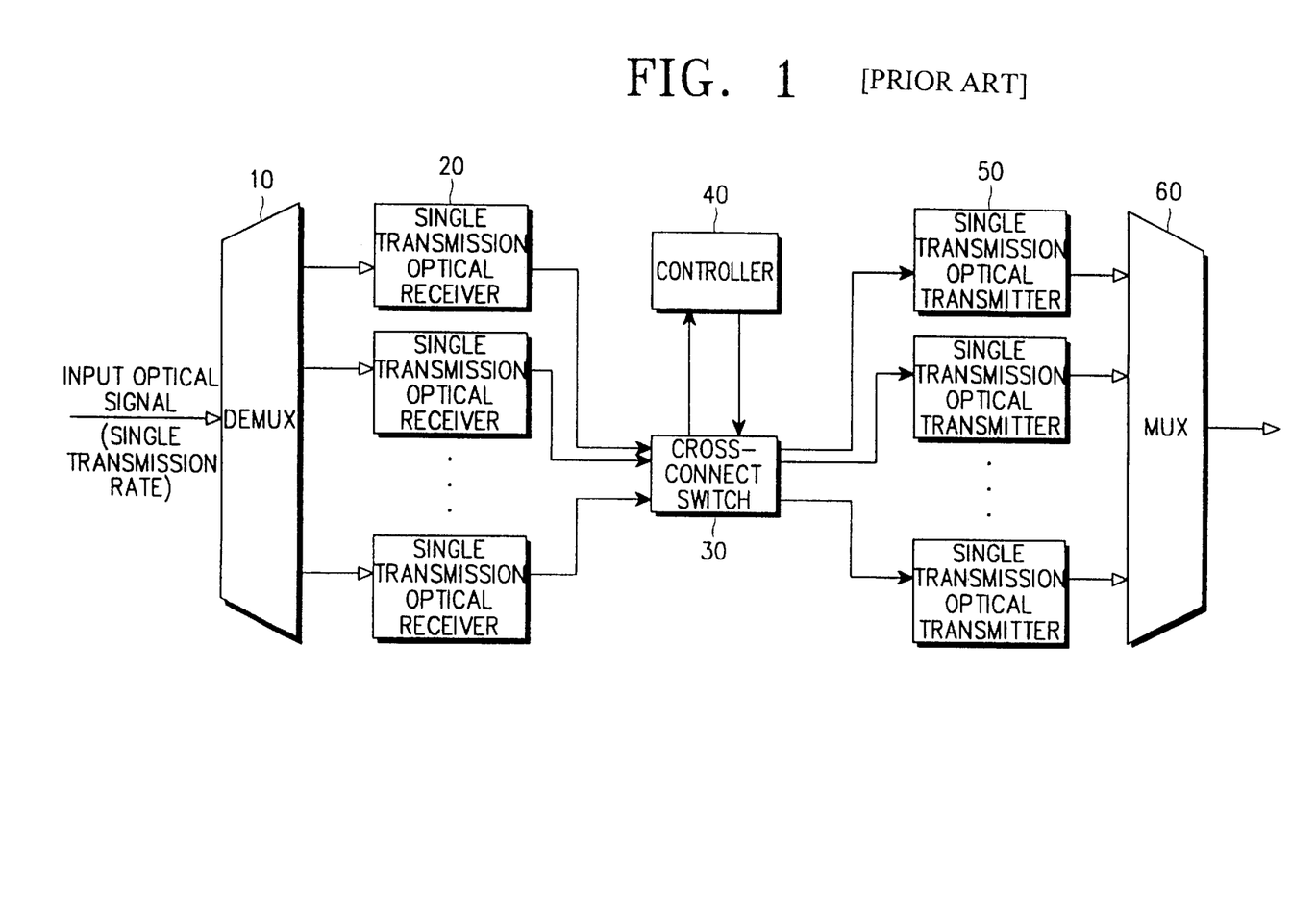
FIG. 1 is a block diagram of a conventional optical cross-connect device.
Figure 2:
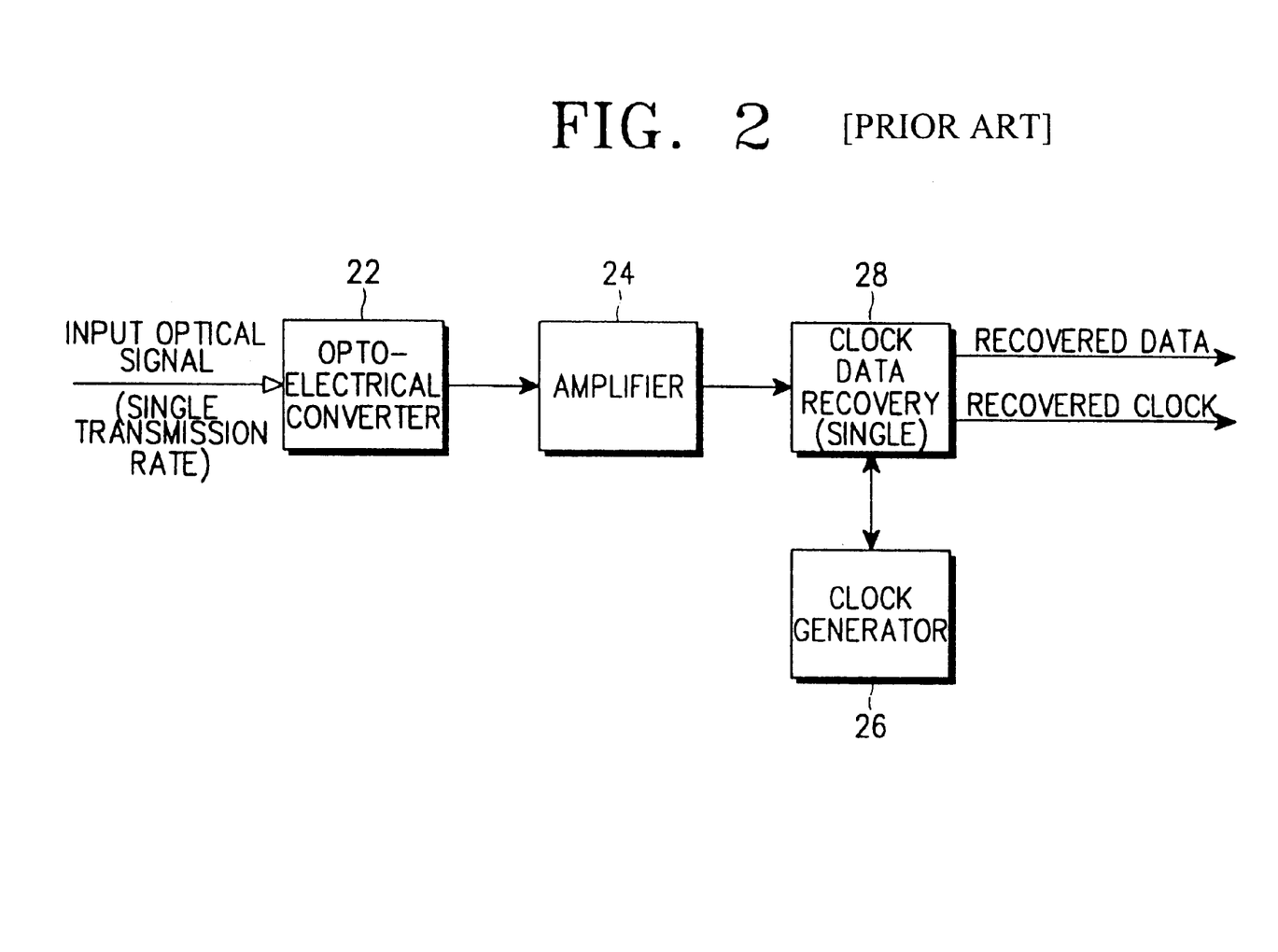
FIG. 2 is a block diagram of a conventional single transmission optical receiver.

FIG. 1 is a block diagram of a conventional optical cross-connect device having an electrical cross-connect switch, and FIG. 2 is a block diagram of the conventional transmission optical receiver.

Referring to FIG. 1, the conventional optical cross-connect device is comprised of a demultiplexer (DEMUX) 10 for demultiplexing an input optical signal into different channels; a plurality of single transmission optical receivers 20 for converting optical channel signals received from the DEMUX 10 to electrical signals; a cross-connect switch 30 for path-routing the electrical signals received from the respective single transmission optical receivers 20; a controller 40 for controlling the path routing of the cross-connect switch 30; a plurality of single transmission optical transmitters 50 for converting the electrical signals received from each output port of the cross-connect switch 30 to optical signals; and, a multiplexer (MUX) 60 for multiplexing the optical signals received from the single transmission optical transmitters 50 onto a strand of optical fiber.

Referring to FIG. 2, each of the single transmission optical receivers 20 includes an opto-electrical converter 22 for converting an input optical signal to an electrical signal; an amplifier 24 for amplifying the electrical signal received from the opto-electrical converter 22; a clock generator 26 for generating a reference clock signal corresponding to the transmission rate of the input optical signal; and, a clock data recovery unit 28 for recovering a clock signal and data from the amplified electrical signal received from the amplifier 24.

The single transmission optical receiver 20 receives an optical signal at a predetermined transmission rate in a single transmission format applied to the corresponding optical communication system. The clock generator 26 outputs a clock signal at a predetermined single frequency, and the clock data recovery unit 28 recovers the clock signal and data by shaping the waveform of the electrical signal converted from the optical signal within the clock signal cycle.

As described above, because the conventional optical cross-connect device includes the single transmission optical receivers 20 and the single transmission optical transmitters 50 that only support one predetermined transmission format and its related transmission rate, the device is unable to operate adaptively to the change in the transmission format and the transmission rate (sometimes referred to as having no transparency). Therefore, the conventional optical cross-connect device has limitations during the operation if the transmission format used is changed, or if at least two transmission formats are employed.

To overcome the limitations, protocol-free systems have been developed to accommodate optical signals with different transmission rates. However, such protocol-free systems are confined to the waveform shaping of signals, without detecting the transmission rates of the signals and recovering clock signals. Accordingly, noise and timing jitter are produced and accumulated through the nodes which in turn deteriorate the transmission quality.

SUMMARY OF THE INVENTION

It is, therefore, an object of the present invention to provide an optical cross-connect device with transparency for accommodating optical signals with diverse transmission rates.

It is another object of the present invention to provide an optical cross-connect device with transparency for increasing transmission quality and transmission distance.

The above objects can be achieved by providing an optical cross-connect device with transparency in an optical communication system. Accordingly, the optical cross-connect device includes a demultiplexer for demultiplexing an input optical signal into different channels; a plurality of arbitrary transmission optical receivers for converting the optical channel signals received from the demultiplexer to electrical signals and for recovering a clock signal and data according to a reference clock signal generated at the transmission rate of the electrical signals; a cross-connect switch that path-routes the electrical signals received from the arbitrary transmission optical receivers; a controller for controlling the path-routing of the cross-connect switch; a plurality of arbitrary transmission optical transmitters for converting the electrical signal received from each output port of the cross-connect switch to an optical signal; and, a multiplexer for multiplexing the optical signals received from the arbitrary transmission optical transmitters onto one stand of optical fiber.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments which depart from these specific details. For the purpose of clarity, detailed descriptions of well-known devices, circuits, and methods are omitted so as not to obscure the description of the present invention with unnecessary detail.

Figure 3:
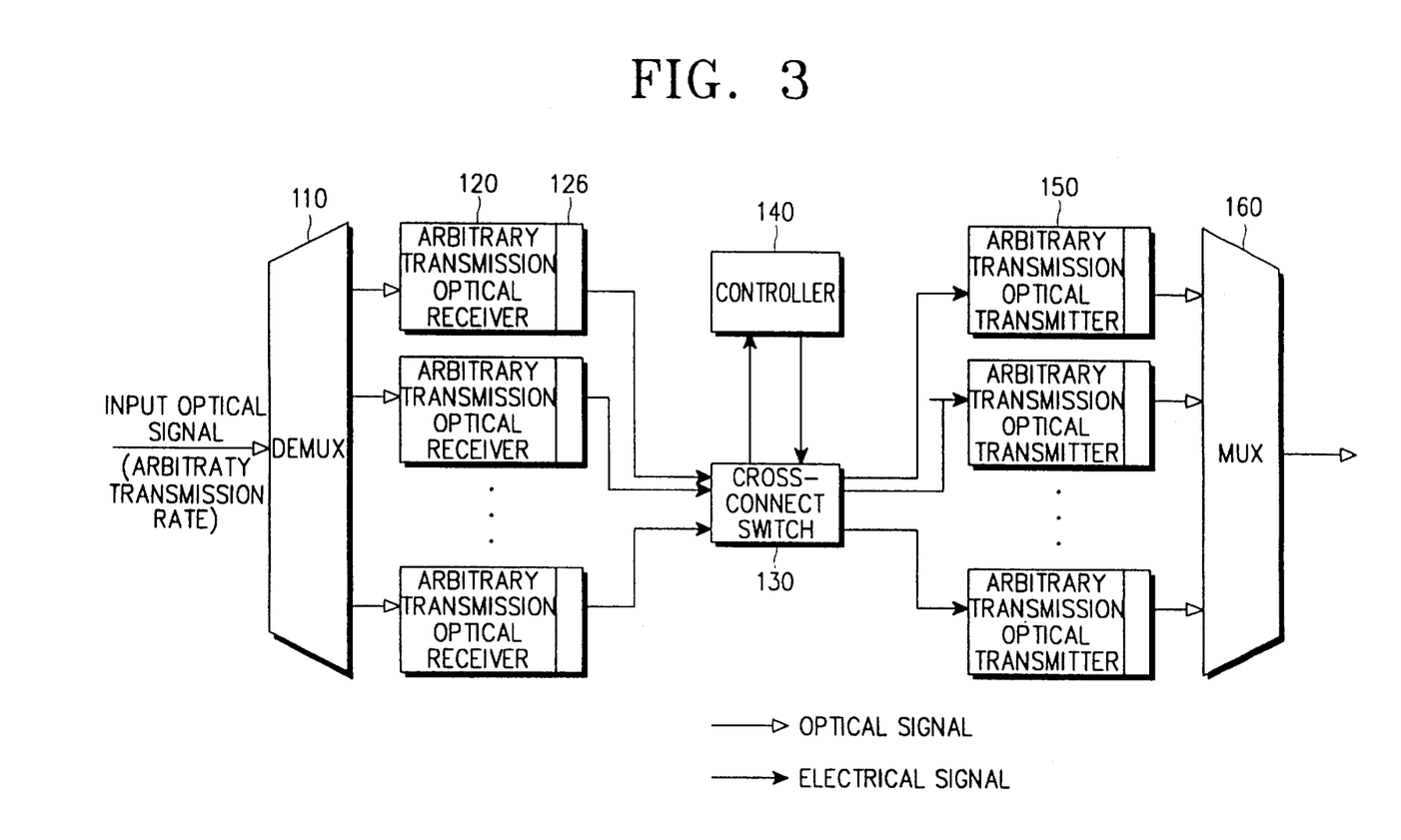
FIG. 3 is a block diagram of an optical cross-connect device according to a preferred embodiment of the present invention.
Figure 4:
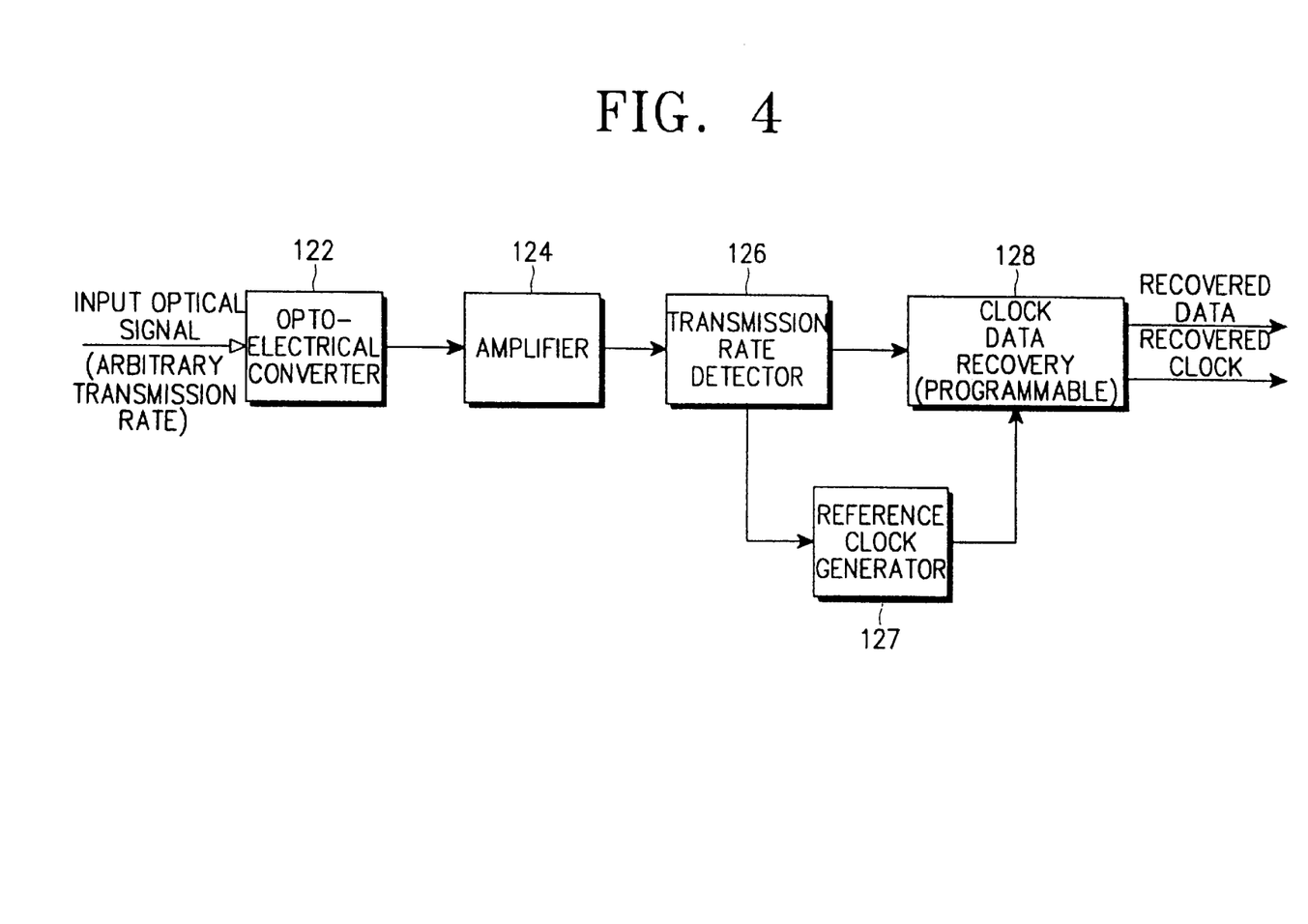
FIG. 4 is a block diagram of an arbitrary transmission optical receiver according to the first preferred embodiment of the present invention.

FIGS. 3 and 4 are simplified block diagrams of an optical cross-connect device and an arbitrary transmission optical receiver, respectively, according to the preferred embodiment of the present invention.

Referring to FIG. 3, the optical cross-connect device according to the first preferred embodiment of the present invention inlcudes a DEMUX 110 for demultiplexing input optical signals into different channels; a plurality of arbitrary transmission optical receivers 120 for converting optical channel signals received from the DEMUC 110 to electrical signals and for generating clock signals and data according to a reference clock signal generated based on the transmission rate of the electrical signals; a cross-connect switch 130 for path-routing the electrical signals received from the respective arbitrary transmission optical receivers 120; a controller 140 for controlling the path routing of the cross-connect switch 130; a plurality of arbitrary transmission optical transmitters 150 for converting electrical signals received from each output port of the cross-connect switch 130 to optical signals; and, an MUX 160 for multiplexing the optical signals received from the respective arbitrary transmission optical transmitters 150 onto a strand of optical fiber.

With reference to FIG. 4, each of the arbitrary transmission optical receivers 120 includes an opto-electrical converter 122 for converting the input optical signal to an electrical signal; an amplifier 124 for amplifying the electrical signal; a transmission rate detector 126 for XOR-gating the amplified electrical signal and a delayed signal resulting from delaying the amplified signal for a predetermined time, and for detecting the transmission rate of the input signal based on the XOR-gated signal; a reference clock generator 127 for generating the reference clock signal according to the detected transmission rate; and, a clock data recovery unit 128 for recovering a clock signal and data from the amplified signal received from the transmission rate detector 126 according to the reference clock signal generated by the reference block generator 127.

Figure 4A:
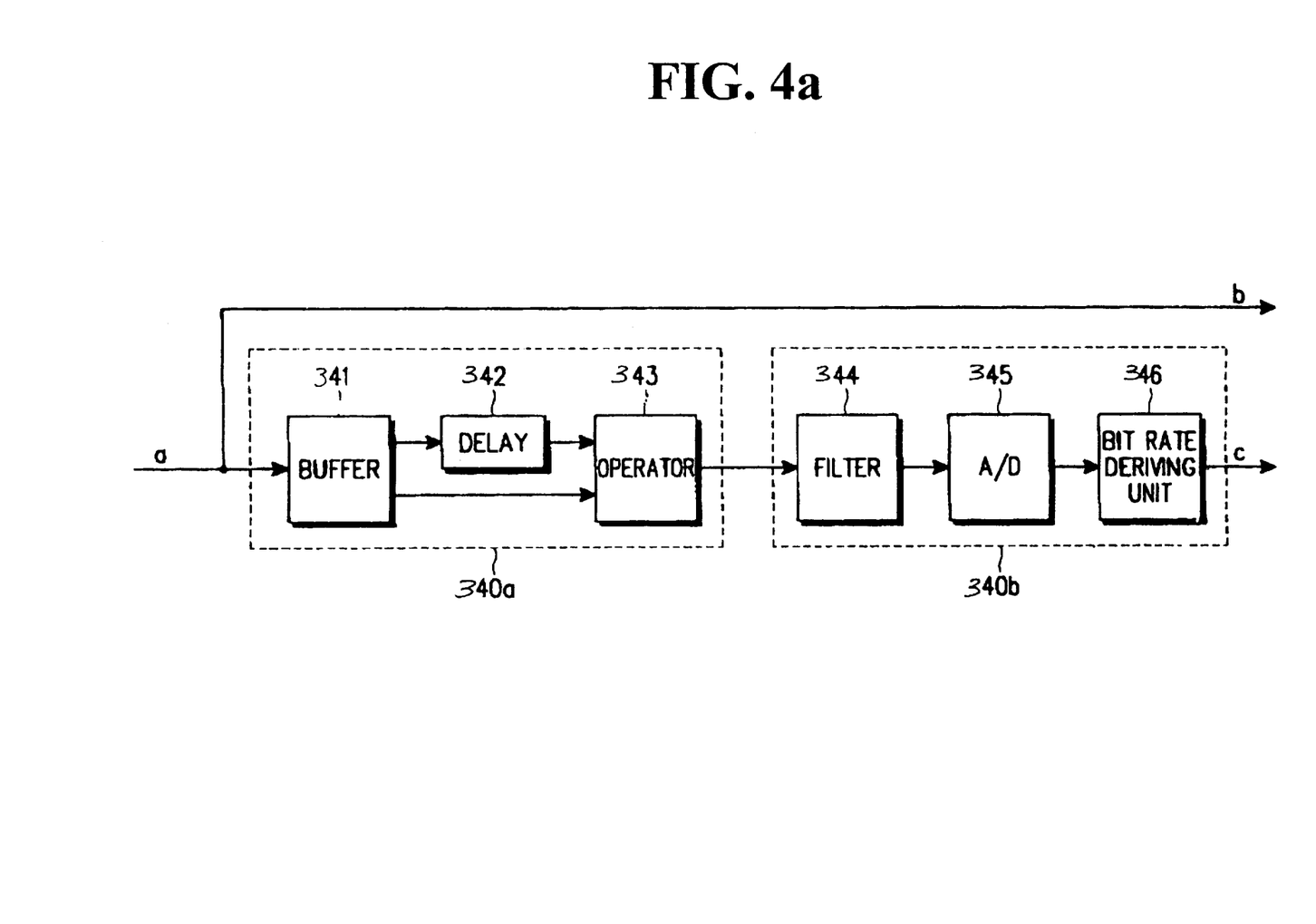
FIG. 4(a) is a block diagram of the transmission rate detector shown in FIG. 4.
Figure 4B:
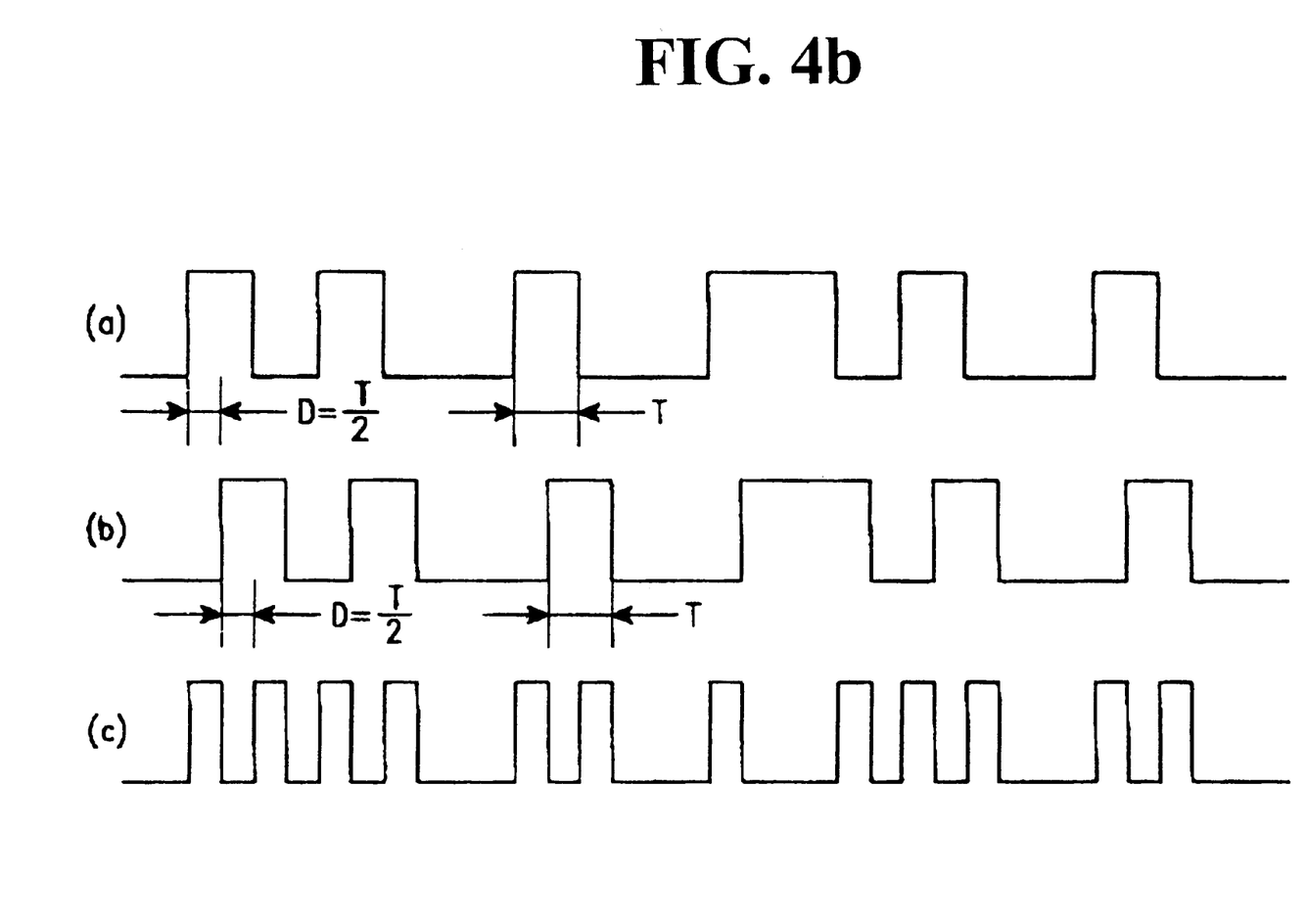
FIGS. 4(b) and (c) illustrate two input signal at a different bit rate.
Figure 4C:
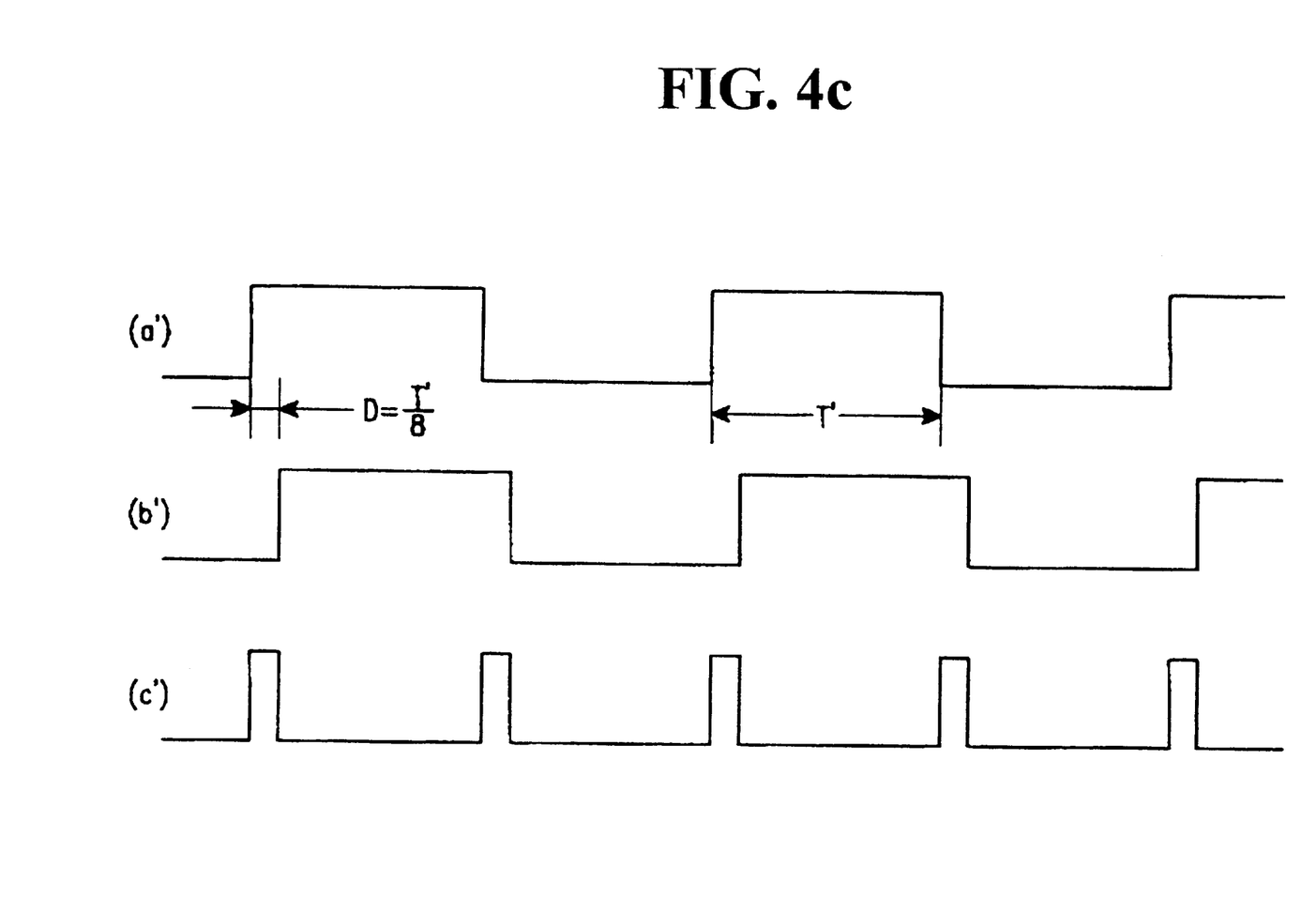

FIG. 4(a) is a simplified block diagram of the transmission rate detector 126 shown in FIG. 4, and FIGS. 4(b) and 4(c) shows signals outputted from function blocks, for describing the operation of the transmission rate detector unit shown in FIG. 4. Referring to FIG. 4(a), the transmission rate detector 126 includes an identification signal generator 340a for delaying an input signal for a predetermined period, comparing the original signal with the delayed signal period by period, and generating a sensing signal, and a transmission rate deriving unit 340b for determining a bit rate of the received signal from a voltage level obtained by low-pass-filtering the identification signal. The identification signal generator 340a includes a buffer 341 for duplicating an input signal into two signals equal to the input signal, a delay 342 for delaying one of the buffer outputs by a predetermined time, and an operator 343 for performing the exclusive OR(XOR) operation upon the delayed signal and the original input signal, and generating a bit rate identification signal.

With reference to FIG. 4(b), the delay 342 generates a signal (b) delayed from an input signal (a) by a predetermined time D, for the input of the signal (with pulse period 2T. The operator 343 generates a sensing signal (c) by XOR-gating the input signal (a) with the delayed signal (b). The sensing signal (c) has a plurality of pulses with high level periods presented at the same intervals as D. FIG. 4(c) illustrates an input signal (a) at a different bit rate from that of the input signal (a) shown i FIG. 4(b). In comparison between FIGS. 4(b) and 4(c), when the sensing signals are generated using input signals received for the same time period, the pulses of the sensing signal(c) are a few times more than those of the sensing signal (c'). The pulse number of the sensing signals are different due to the different bit rates of the input signals; thus, the difference between the pulse numbers is proportional to the difference between th bit rates. Therefore, the transmission rate can be detected by checking the number of pulses of a sensing signal generated for a predetermined time. For more details of the operation and configuration of the arbitrary transmission optical receiver 120, see U. S. patent application Ser. No. 09/484, 061 filed on Jan. 18, 2000 and U.S. patent application Ser. No. 09/621,009 filed on Jul. 20, 2000 by the present applicant. Thus, the description of the transmission rate detector is incorporated by reference.

In the embodiment of the present invention, the transmission rate detector 126 generates a sensing signal by comparing the delayed signal with the amplified signal in time and determines the transmission rate based on a voltage level resulting from low-pass filtering the sensing signal. That is, the transmission rate detector 126 detects the transmission rate of the input signal based on the voltage level obtained by XOR-gating the delayed signal and the amplified signal, then low pass filtering the XOR-gated signal.

The reference clock generator 127 includes a plurality of oscillators for generating clock signals at different frequencies. Accordingly, the reference clock generator 127 selectively operates one of the oscillators to generate a reference clock signal corresponding to the detected transmission rate.

The clock data recovery unit 128 is a programmable circuit for subjecting the received electrical signal for reshaping, regenerating, and retiming of an input signal according to the reference clock signal received from the reference clock generator 127.

Figure 5:
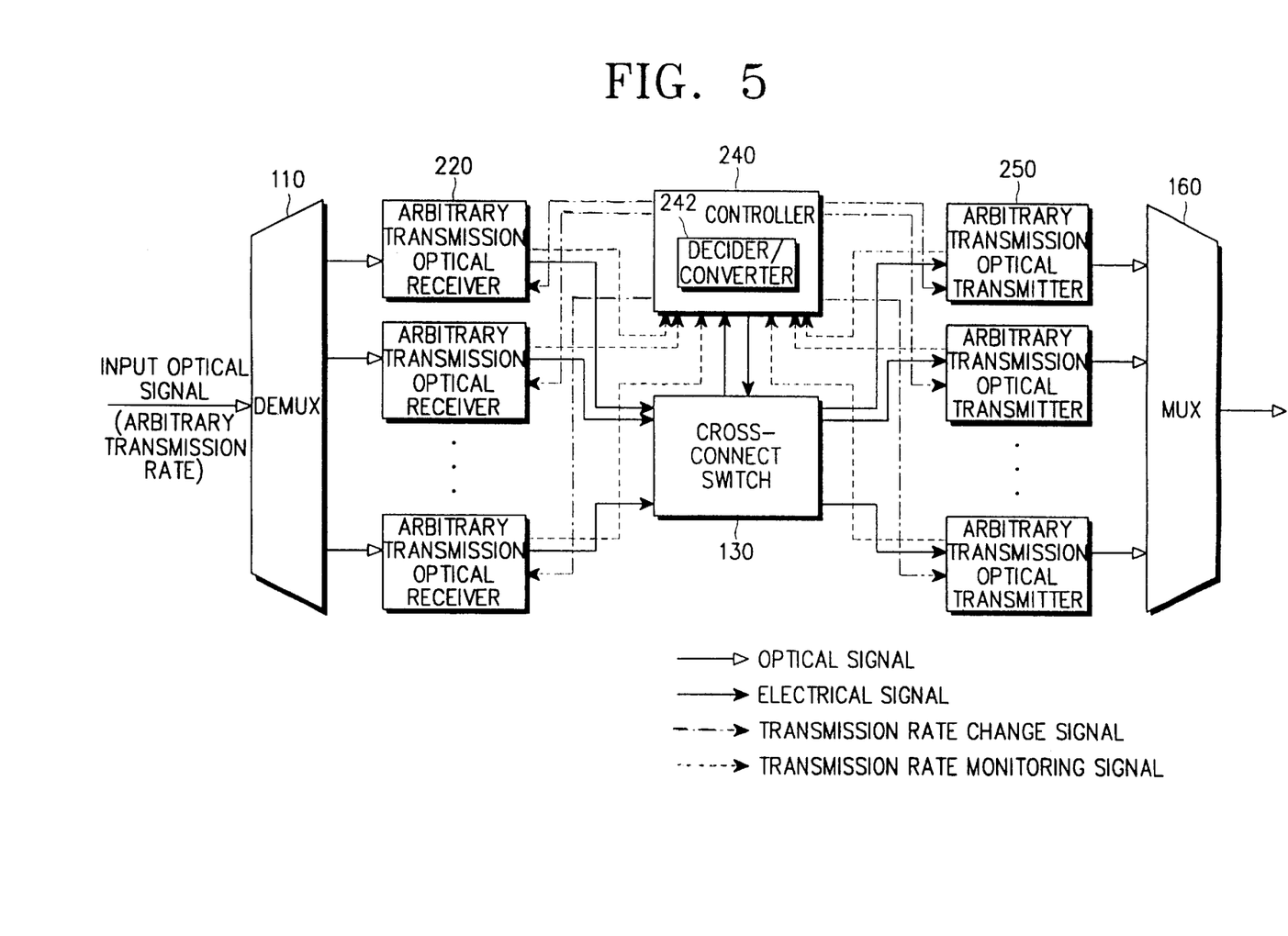
FIG. 5 is a block diagram of an optical cross-connect device according to another preferred embodiment of the present invention; and, FIG. 6 is a block diagram of an arbitrary transmission optical receiver according to the second preferred embodiment of the present invention.
Figure 6:
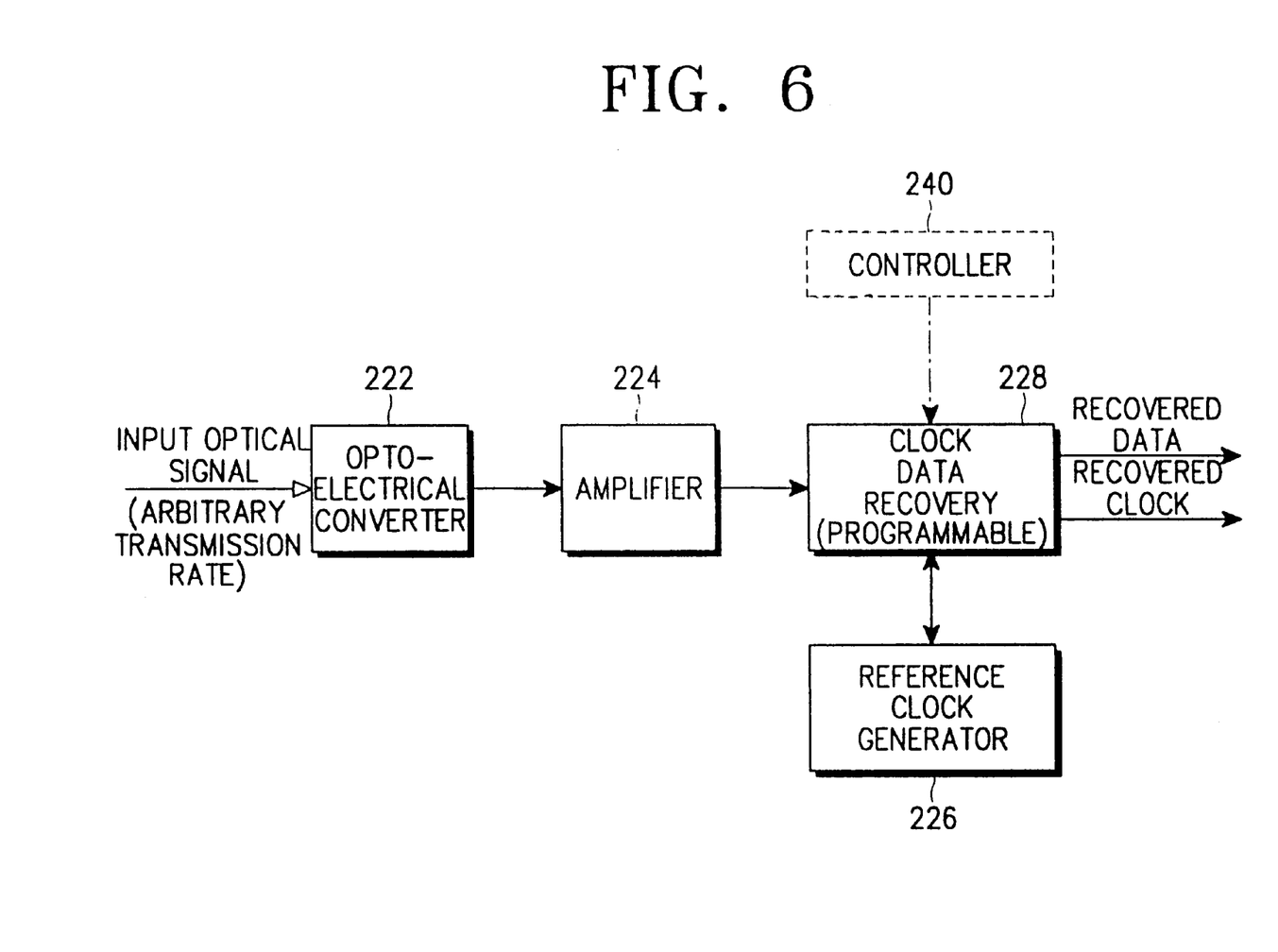

FIGS. 5 and 6 are respective block diagrams of an optical cross-connect device and an arbitrary transmission optical receiver according to another preferred embodiment of the present invention.

With reference to FIG. 5, the optical cross-connect device according to the second preferred embodiment of the present invention includes a DEMUX 110 for demultiplexing input optical signals into different channels; a plurality of arbitrary transmission optical receivers 220 for outputting a transmission rate monitoring signal to the controller 240, by converting optical channel signals received from the DEMUX 110 to electrical signals, and for recovering clock signals and data according to a reference clock signal generated from the reference clock generator 226 (will be explained later with reference to FIG. 6) upon receipt of a transmission rate change signal from the controller 240; a cross-connect switch 130 for path-routing the electrical signals received from the arbitrary transmission optical receivers 220; a controller 240 for controlling the path routing of the cross-connect switch 130, determining the transmission rate from the transmission rate monitoring signal, and feeding the transmission rate change signal to the arbitrary transmission optical receivers 220 and a plurality of arbitrary transmission optical transmitters 250; the plurality of arbitrary transmission optical transmitters 250 for converting electrical signals received from each output port of the cross-connect switch 130 to optical signals; and, a MUX 160 for multiplexing the optical signals received from the arbitrary transmission optical transmitters 250 onto a strand of optical fiber.

The controller 240 has a decider/converter 242 for generating a transmission speed sensing signal by comparing the electrical signal received from the arbitrary transmission optical receivers 220 with the signal resulting from delaying the electrical signal in time, and for determining the transmission rate based on the voltage level obtained by low-pass filtering the sensing signal.

Referring to FIG. 6, the components of each arbitrary transmission optical receivers 220 include an opto-electrical converter 222 for converting the input optical signal to an electrical signal; an amplifier 224 for amplifying the electrical signal; a reference clock generator 226 for generating the reference clock signal according to the transmission rate change received from the controller 240; and, a clock data recovery unit 228 for recovering the clock signal and data from the amplified signal received from the amplifier 224 according to the reference clock signal from the reference clock generator 226. In contrast to the first embodiment, the arbitrary transmission optical receiver 220 according to the second embodiment differs in that it does not have an interior control means such as the transmission rate detector, and generates the reference clock signal and recovers the clock signal and data based on the transmission rate information received from the controller 240.

The reference clock generator 226 includes a plurality of oscillators for generating clock signals at different frequencies. The reference clock generator 226 selectively operates one of the oscillators to generate a reference clock signal corresponding to the transmission rate determined by the controller 240.

The clock data recovery unit 228 is a programmable circuit for subjecting the received electrical signal to reshaping, regenerating, and retiming the input signal according to the reference clock signal received from the reference clock generator 226.

As described above, the optical cross-connect device of the present invention can ensure transparency, i.e., flexibility, because it accommodates signals of diverse transmission formats and related transmission rates. Furthermore, a reference clock signal is generated by detecting a transmission rate, so that noise and timing jitter are reduced and transmission quality and transmission distance are enhanced.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An optical cross-connect device in an optical communication system, comprising: a demultiplexer for demultiplexing an input optical signal into different channels; a plurality of optical receivers for outputting a transmission rate monitoring signal by converting the demultiplexed signals received from the demultiplexer to electrical signals, and for recovering a clock signal and data according to a reference clock signal generated upon the receipt of a transmission rate change signal; a cross-connect switch for path-routing the electrical signals received from the arbitrary transmission optical receivers; a controller for controlling the path-routing of the cross-connect switch, determining a transmission rate from the transmission rate monitoring signal, and feeding the transmission rate change signal to the arbitrary transmission optical transmitters; a plurality of optical transmitters for converting the electrical signal received from each output port of the cross-connect switch to an optical signal; and, a multiplexer for multiplexing the optical signals received from the optical transmitters onto one strand of optical fiber.

2. The optical device of claim 1, wherein each of the optical receivers comprises: an opto-electrical converter for converting the input optical signal to an electrical signal; an amplifier for amplifying the electrical signal; a reference clock generator for generating the reference clock signal according to the transmission rate change signal received from the controller; and, a clock data recovery unit for receiving the electrical signal and recovering a clock signal and data from the electrical signal based on the reference clock signal.

3. The optical device of claim 1, wherein the controller includes a decider for generating a sensing signal by comparing the electrical signal received from the optical receivers with a signal resulting from delaying the electrical signal for a predetermined time, and for determining the transmission rate based on the voltage level obtained by low-pass filtering the sensing signal.

4. The optical device of claim 2, wherein the reference clock generator includes a plurality of oscillators for generating clock signals at different frequencies.

* * * * *